Jan. 23, 1934.    S. E. PATCHELL ET AL    1,944,365
ELECTRICAL COOKING APPLIANCE
Filed Oct. 29, 1932
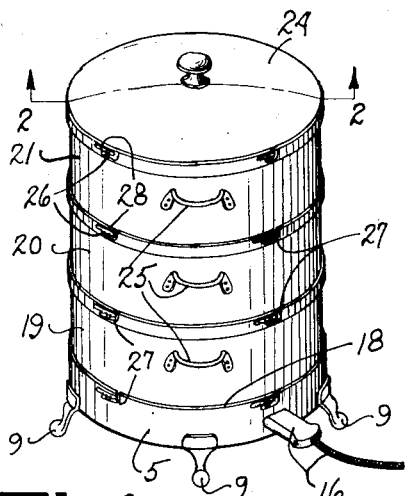
Fig.1
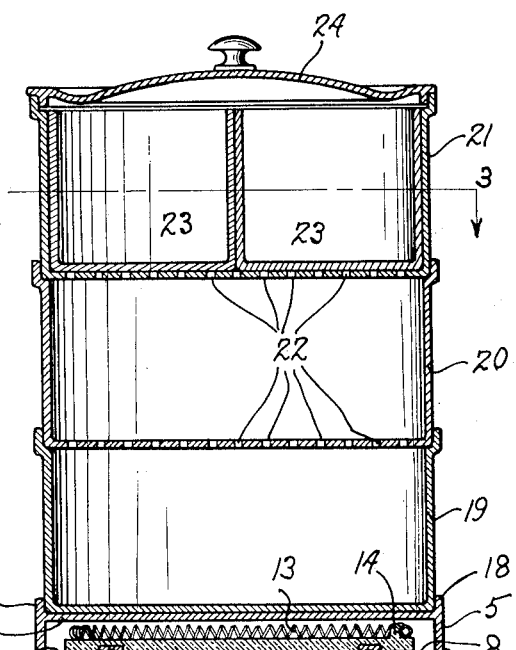
Fig.2
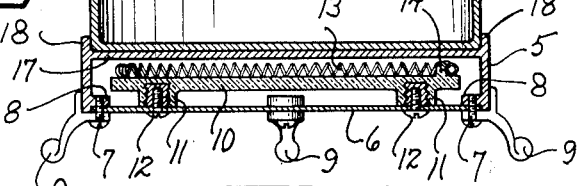
Fig.3
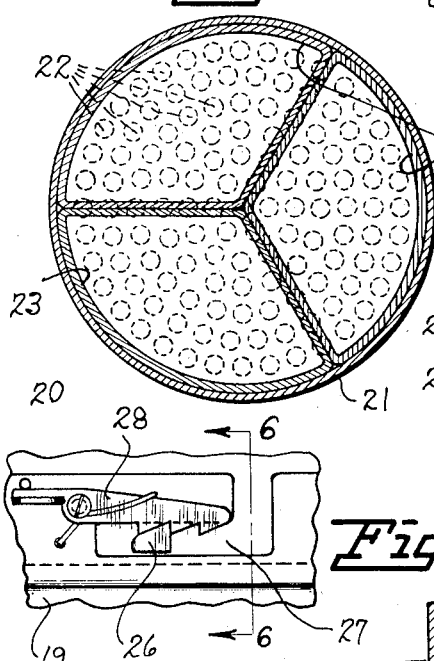
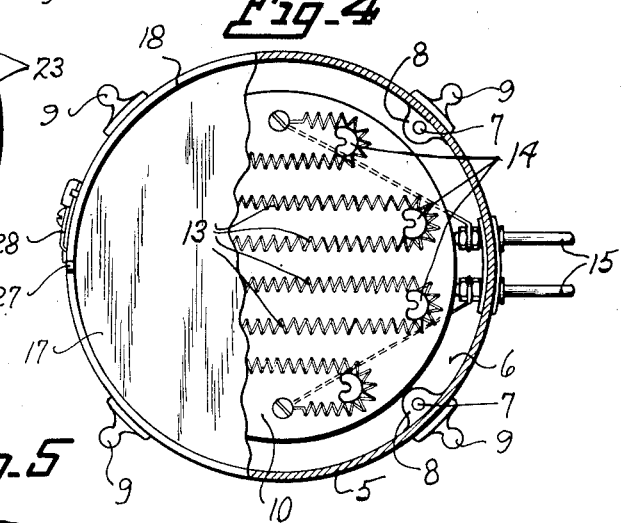
Fig.4
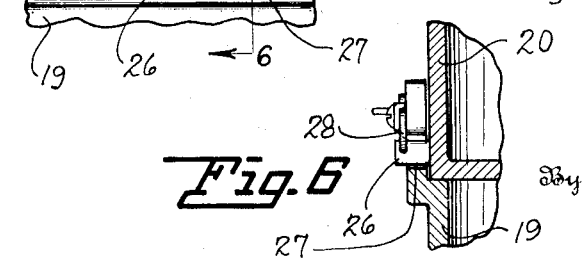
Fig.5
Fig.6
Inventor
Sarah E. Patchell
Charles T. Maxwell
By Glenn L. Fish
Attorney Patented Jan. 23, 1934

1,944,365

UNITED STATES PATENT OFFICE 1,944,365

ELECTRICAL COOKING APPLIANCE

Sarah E. Patchell and Charles T. Maxwell, Spokane, Wash.

Application October 29, 1932. Serial No. 640,268

2 Claims. (Cl. 219—43)

Our invention relates to electrical cooking appliances and certain objects of the invention are to provide an appliance comprising a series of electrically heated cooking utensils or food receptacles superimposed upon one another and having a bottom heating receptacle whereby food may be cooked by either using dry or steam heat. Further objects are to provide novel means for detachably fastening the various cooking receptacles together. Still further objects are to provide a bottom heating receptacle wherein an electrical heating element is completely enclosed and whereby heat from the element is conserved and radiated directly against the cooking or heating top plate of the receptacle.

With the above and other objects in view which will appear as the description proceeds, the invention consists of the novel construction, adaptation, combination and arrangement of parts hereinafter described and claimed. These objects are accomplished by devices illustrated in the accompanying drawing; wherein: Figure 1 is a general view in perspective of the device; Fig. 2 is a view in central vertical section of the same taken on a broken line 2—2 of Fig. 1; Fig. 3 is a view in horizontal section taken on a broken line 3—3 of Fig. 2; Fig. 4 is a top plan view of the bottom heating receptacle with parts broken away to show the heating element; Fig. 5 is an enlarged detail view in elevation showing the means for fastening the utensils or receptacles together; and Fig. 6 is a view in vertical section taken on a broken line 6—6 of Fig. 5.

Referring to the drawing throughout which like reference numerals indicate like parts, the numeral 5 designates the bottom or heating receptacle which is preferably cylindrical in shape and has a detachable bottom plate 6 connected thereto by means of screws 7 threaded into bosses 8 that are formed on the heating receptacle casting. Said screws 7 also serve to secure legs 9 to the bottom receptacle. An insulator plate 10 is provided with short legs 11 which rest on the bottom plate 6 and are secured thereto by screws 12. Said insulator plate is provided with a heating element 13 of the usual coiled resistance wire type stretched over small upstanding projections 14 around the outer edge of the plate. The terminals of said element are connected to posts 15 which extend exteriorly of the bottom heating receptacle 5 and the usual electric cord and socket 16 may be connected to said posts as shown in Fig. 1. Said heating receptacle is provided with an integral top 17 and an annular flange 18 projects above said top. It will thus be seen that the heating element is completely housed within a closed compartment whereby the heat is prevented from rapid radiation and dissipation and is directed against the bottom of the top 17 thus giving a maximum heating effect.

A series of utensils or food receptacles 19, 20 and 21 respectively are superimposed upon one another, each having an enlarged top flange or rim that is adapted to snugly receive the bottom of the next receptacle above. The lowermost receptacle 19 has a solid or closed bottom which fits into the flange 18 and seats on the top 17 of the bottom heating receptacle 5. Perforations 22 may be provided through the bottoms of the other two receptacles through which heat may pass upwardly, or the bottom receptacle may be filled with water and steam may pass therefrom upwardly through the perforations into the other receptacles as will be understood. As shown in Figs. 1 and 3, a plurality of segmental or individual receptacles 23 may be placed in any one of the main receptacles. A lid 24 is used to cover the uppermost receptacle 21. Lifting handles 25 may be provided for each of the receptacles if desired.

A shoulder 26 is fixed to the outside of each of the receptacles 19, 20 and 21 and near the bottoms thereof. The top flanges of each of said receptacles together with the top flange of the bottom heating receptacle 5 are each provided with an L-shaped slot 27 that is adapted to receive the shoulder 26. A spring depressed latch 28 is pivotally connected to each of the flanges adjacent their L-shaped slots and said latch is provided with notches that are arranged to catch against the shoulder 26. Therefore when said slots slip over the shoulders and the receptacles are slightly turned the latches will automatically take hold of the shoulders. This arrangement provides a simple means for connecting the receptacles together and same may be readily disconnected by lifting the latches.

It will be understood that the bottom heating receptacle 5 may be used separately as a griddle or the like, or same may be used in any combination with the receptacles 19, 20, 21 or 23. Our device provides a universal type of cooking appliance which may be used variously for frying, baking, boiling, stewing or steaming foods. It is therefore possible to prepare an entire meal with the device thus greatly saving in the cost of electrical energy and combining economy and efficiency with convenience in use.

Having thus described our invention, it being understood that minor changes in its construc- tion and arrangement may be resorted to without departing from the scope and spirit of the invention, what we claim and desire to secure by Letters Patent of the United States is:—

1. An electrical cooking appliance comprising in combination a lower heating receptacle completely enclosing a heating element and having an upstanding rim, a bottom plate detachably secured to said receptacle and forming a closure therefor, a plurality of food receptacles superimposed upon said heating receptacle, the lowermost of said food receptacles having a closed bottom, the other food receptacles having perforated bottoms whereby steam passes upwardly thereinto from the lowermost receptacle, and a plurality of segmental receptacles fitted into the uppermost of said food receptacles.

2. In an electrical cooking appliance comprising a lower heating receptacle and a plurality of food receptacles superimposed upon said heating receptacle, the combination of means for detachably fastening said receptacles together, said fastening means comprising an L-shaped slot formed in the upper flange portion of said receptacles, a spring depressed latch pivotally connected to the receptacles adjacent said slots and having notches therein, and a shoulder fixed to the lower side portion of the receptacles and arranged to be moved into the L-shaped slot whereby the notches on the latch snap into engagement therewith.

SARAH E. PATCHELL.
CHARLES T. MAXWELL.